United States Patent [19]

Dougherty et al.

[11] Patent Number: 4,627,304

[45] Date of Patent: Dec. 9, 1986

[54] LINKAGE ANTI-RATTLE DEVICE AND ARRANGEMENT

[75] Inventors: Michael Dougherty, East Detroit; William J. House, Sterling Heights, both of Mich.

[73] Assignee: Colt Industries Operating Corp, New York, N.Y.

[21] Appl. No.: 725,107

[22] Filed: Apr. 19, 1985

[51] Int. Cl.$^4$ ........................ G05G 1/00; F02M 19/12; F16B 7/04

[52] U.S. Cl. ........................................ 74/469; 24/573; 261/52; 403/70; 403/71; 403/348

[58] Field of Search .................... 74/469, 519; 24/573; 261/52; 123/336; 403/69, 70, 71, 348

[56] References Cited

U.S. PATENT DOCUMENTS

| | | | |
|---|---|---|---|
| 1,912,757 | 6/1933 | Brump | 74/10.9 |
| 2,125,538 | 8/1938 | Boyce | 261/52 |
| 2,393,440 | 1/1946 | Wirth | 261/52 X |
| 3,007,725 | 11/1961 | Becker et al. | 403/69 |
| 3,165,000 | 1/1965 | Teaf | 74/10.9 X |
| 3,357,274 | 12/1967 | Dapoz | 74/469 |
| 3,984,191 | 10/1976 | Doty | 403/69 |
| 4,307,042 | 12/1981 | Berich | 403/71 X |

FOREIGN PATENT DOCUMENTS

| | | | |
|---|---|---|---|
| 1289376 | 2/1969 | Fed. Rep. of Germany | 74/469 |

*Primary Examiner*—Allan D. Herrmann

*Attorney, Agent, or Firm*—Walter Potoroka, Sr.

[57] ABSTRACT

A plurality of interconnected linkages are shown with a resilient clip-like member operatively connected to a first of the linkages and resiliently engaging another of the linkages so as to cause an abutment carried by the first linkage to be held in contact with the other linkage and thereby eliminate rattling noises as would otherwise occur between the first and the other linkage.

7 Claims, 9 Drawing Figures

LINKAGE ANTI-RATTLE DEVICE AND ARRANGEMENT

FIELD OF THE INVENTION

This invention relates generally to mechanical linkage arrangements and more particularly to apparatus which when employed in combination with such mechanical linkage arrangements serves to preclude the occurrence of rattling noises in or among such mechanical linkage arrangements.

BACKGROUND OF THE INVENTION

Usually, in the interests of minimizing manufacturing costs, motion transmitting or control type mechanical linkages are produced having relatively large dimensional tolerances in at least selected areas as, for example, where the respective ends of a particular linkage operatively connect to associated levers and/or other linkages. Often such linkage ends are received within apertures, and the like, which also have relatively large dimensional tolerances. The fact that such cooperating linkages, levers and apertures have relatively large dimensional tolerances in no way reduces or impairs the safety or operation thereof. However, because of relative looseness of the interconnections of such linkage means such become highly susceptible to vibrations, induced as by associated structure, and such vibrations, in turn, more often than not result in an annoying rattling sound or noise.

In present-day automotive four cylinder internal combustion engines considerable vibrations are generated by the engine and all engine accessories mounted onto the engine are directly effected by such vibrations. Where, in such situations, linkages and/or levers are employed, such experience the vibrations induced by the engine and respond by generating annoying rattling sounds or noises.

The invention as herein disclosed and described is primarily directed to the solution of and elimination of such annoying rattling sounds or noises as well as other related and attendant problems.

SUMMARY OF THE INVENTION

According to one aspect of the invention, a mechanical spring-like clip means is attached as to the juncture of two cooperating linkage members and situated as to resiliently urge such linkage members against or away from each other so that rattling will not occur therebetween and, at the same time, cause a resilient force on at least one of the linkage members so that such at least one of the linkage members has its other operative end urged against another linkage member and thereby eliminate rattling therebetween.

Various general and specific objects, advantages and aspects of the invention will become apparent when reference is made to the following detailed description considered in conjunction with the accompanying drawings.

BRIEF DESCRIPTION OF THE DRAWINGS

In the drawings, wherein for purposes of clarity certain details may be omitted from one or more views.

DETAILED DESCRIPTION OF THE PREFERRED EMBODIMENT

Figure 1:
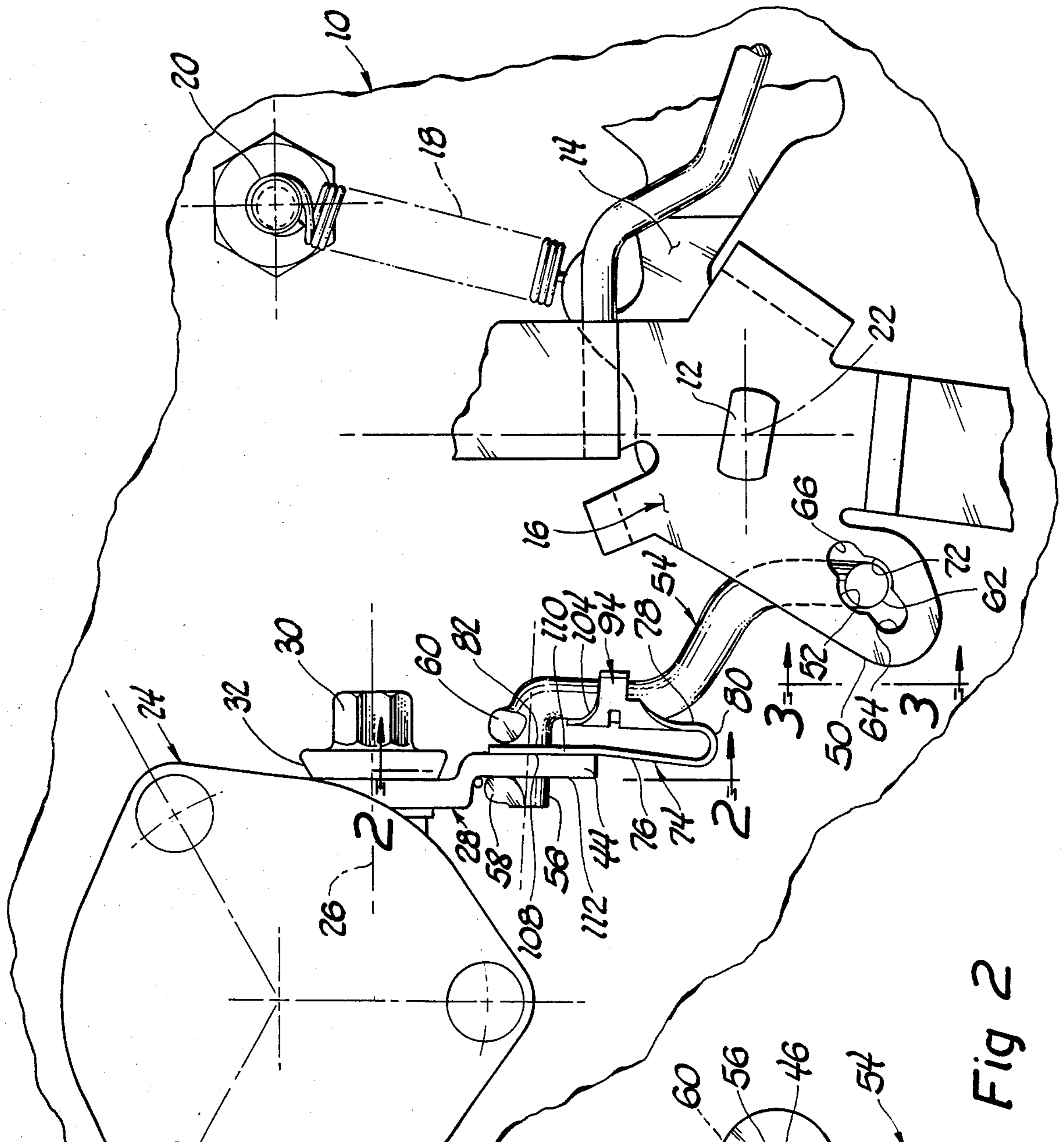
FIG. 1 is a fragmentary side elevational view of a fuel metering or induction passage means, leading as to an associated engine, with certain of the levers and/or linkages shown in fragmentary form, and illustrating certain linkage means employing teachings of the invention.

Referring now in greater detail to the drawings, FIG. 1 illustrates, fragmentarily, an engine induction control apparatus 10 which may be comprised of an induction passage (not shown) formed therethrough and having a throttle shaft 12 extending as through such induction passage and carrying an associated throttle valve (not shown) within the induction passage for selective rotation in unison with said throttle shaft 12.

Various levers may be operatively connected to the throttle shaft 12 as, for example, levers 14 and 16 of which lever 14 may be operatively connected to both the throttle shaft 12 and resiliently urged as in a counter-clockwise direction by spring means 18 secured to a suitable spring seat 20. Lever 16 is suitably fixedly secured to the throttle shaft 12 for rotation in unison therewith about throttle shaft axis 22. As depicted in FIG. 1, clockwise rotation of lever means 16 and throttle shaft 12 results in a corresponding opening movement of the throttle valve (not shown) secured to and operated by throttle shaft 12.

An induction passage choke valve control means is depicted at 24 and may comprise suitable thermostatic means for positioning the induction passage choke valve (not shown but well known in the art) generally in accordance with engine and/or ambient temperature. In the embodiment depicted, the choke control means 24 may comprise shaft-like means, the center of rotation or axis being at 26, to which an actuating lever 28 is fixedly secured as by a threaded engagement with a nut 30 having an enlarged flange 32 axially constraining one end of lever 28 so that rotation of lever 28 generally about axis 26 causes corresponding rotation of the said shaft-like means, whose axis is 26, and such movement or rotation forces a partial opening of the choke valve (not shown).

Figure 2:
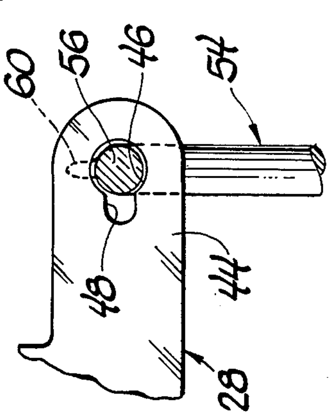
FIG. 2 is a fragmentary view taken generally on the plane of line 2—2 of FIG. 1, with certain elements not shown for purposes of clarity, and looking in the direction of the arrows.

As generally depicted in FIG. 2, the lever 28 may have an extending arm portion 44 with an aperture 46 formed therethrough along with a keyway-like or clearance slot 48 which opens into the aperture or passage 46.

The throttle lever 16 may be provided with an arm portion 50 through which an aperture or passage 52 is formed.

A rod-like linkage member 54 serves to operatively interconnect arm 44 of lever 28 with arm 50 of lever 16.

As best seen in FIG. 1, the upper end 56 of linkage means 54 is provided with two axially spaced generally aligned upset or key-like abutment portions 58 and 60 formed integrally with such upper end 56. Generally, in assembling linkage means 54 to lever or linkage means 28, such linkage means 54 and 28 are rotated relative to each other as to permit the first abutment or upset portion 58 to pass through slot 48 and thereby enable the upper portion 56 of linkage means 54 to extend through passageway 46 of lever arm 44. Once the first abutment or upset portion 58 thusly passes through the slot or clearance opening 48 the linkage means 28 and 54 are again rotated relative to each other thereby placing the abutments or upset portions 58 and 60 out of registry with clearance slot 48 and at opposite sides of lever arm 44 thereby effectively keeping linkage means 54 from disengaging from lever means 28.

Figure 3:
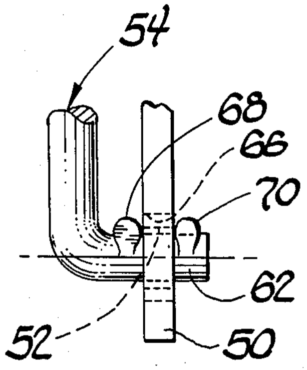
FIG. 3 is a fragmentary view taken generally on the plane of line 3—3 of FIG. 1 and looking in the direction of the arrows.
Figure 4:
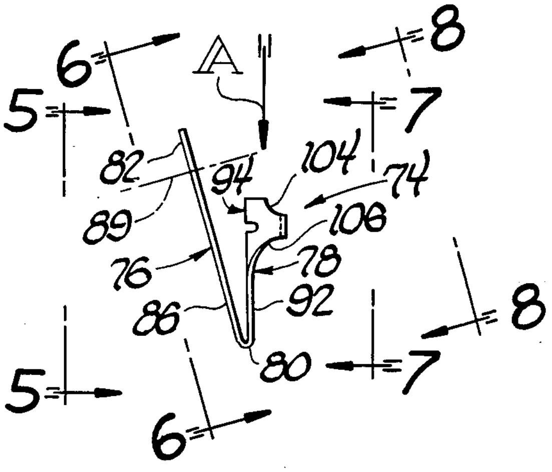
FIG. 4 is a side elevational view of one of the elements shown in FIG. 1 and illustrated in what may be considered its free and unassembled state or configuration.
Figure 5:
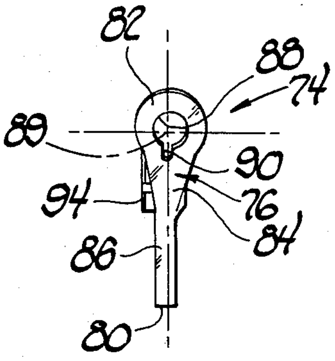
FIG. 5 is a view taken generally on the plane of line 5—5 of FIG. 4 and looking in the direction of the arrows.
Figure 6:
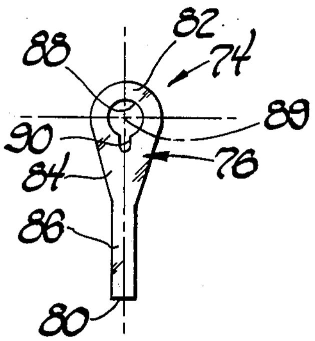
FIG. 6 is a view taken generally on the plane of line 6—6 of FIG. 4 and looking in the direction of the arrows.
Figure 7:
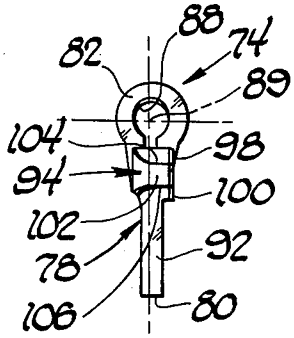
FIG. 7 is a view taken generally on the plane of line 7—7 of FIG. 4 and looking in the direction of the arrows.
Figure 8:
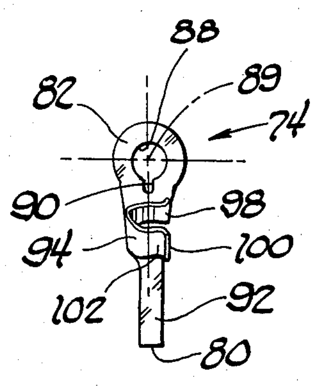
FIG. 8 is a view taken generally on the plane of line 8—8 of FIG. 4 and looking in the direction of the arrows.
Figure 9:
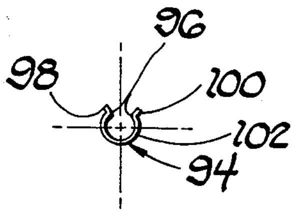
FIG. 9 is a view taken in the direction of arrow A of FIG. 4.

Referring to FIGS. 1 and 3, the aperture or passage 52 is of a size as to generally loosely accommodate the passage therethrough of the lower end portion 62 of linkage means 54. Lever arm 50 is depicted as also having diametrically oppositely situated clearance slots 64 and 66 each of which open into the passage 52. Slots 64 and 66 are not large enough to accommodate the lower portion 62 of linkage 54 but serve as clearance apertures or slots for axially spaced upset or key-like abutment portions 68 and 70 which may be in alignment with each other as generally depicted in FIG. 3 or situated diametrically opposed to each other. The abutment or upset portions 68 and 70 are, for purposes of clarity, not shown in FIG. 1. Nevertheless, linkage means 54 and lever arm 50 are operatively assembled to each other in a manner at least similar to that employed in assembling linkage means 54 and lever arm 44. That is, briefly, the lever arm 50 and linkage 54 are rotated relative to each other until abutment or upset portion 70 (FIG. 3) passes through either slot opening 64 or 66 at which time the linkage 54 and lever arm 50 are again rotated relative to each other so as to bring both abutment portions 68 and 70 out of registry with either or both slots or key-ways 64 and 66 as to be respectively situated at opposite sides of and contain lever arm 50 therebetween.

As should be apparent rotation of throttle lever 16, in the clockwise direction about axis 22 causes a related movement of lever means 28 through the interconnection of linkage means 54.

For sake of ease of drawing and for purposes of clarity, the bottom or lower portion 62 of linkage 54 is illustrated as being centered within aperture or passage 52 whereas, in fact, as the description progresses, it will become evident that the lower portion 62 of linkage 54 is effectively resiliently held against surface portion 72 of such passage means 52.

As illustrated in FIG. 1, a silencing retainer or clip means 74 is operatively connected to linkage means 54 and lever arm means 44.

Referring now also to FIGS. 4–9, the silencing retainer means 74 is illustrated as preferably comprising first and second body-like portions 76 and 78 operatively joined to each other as at an integrally formed bight portion 80. Preferably the retainer means 74 is comprised of spring steel such as, for example, carbon steel 1050 with a hardness of RC 40–50.

Body portion 76 of retainer means 74 is preferably provided with a relatively enlarged upper end 82, which for the most part may have a circular outer configuration which through an integrally formed transitional portion 84 connects to and is carried by a relatively narrow integrally formed leg portion 86 which, in turn, is integrally formed with one side of said bight portion 80. The upper enlarged end 82 has an aperture or passageway 88 formed therethrough having an axis 89. Such aperture 88 is of a size and cofiguration permitting the upper portion 56 of linkage 54 to pass therethrough. A slot or keyway-like clearance 90 is also formed in the enlarged end 82 in a manner as to open into aperture 88. In the embodiment depicted the slot or opening 90 is downwardly directed; however, its relative position may be selectively changed depending upon the geometry of the cooperating linkage means and the motion which each would undergo during operation.

Body-like portion 78 is illustrated as preferably comprising a relatively narrow leg-like portion 92 integrally joined at its lower end to the bight portion 80 and, at its upper free end, having an integrally formed C-like clasp portion 94. Preferably, as viewed in FIG. 9, the clasp portion 94 has its main body portion of generally tubular configuration and open as at 96 with respective outwardly directed flange portions 98 and 100. In forming such a C-like clasp portion 94, that part of it which is more closely disposed to opposed body portion 76 is preferably integrally formed with leg portion 92, and of course suitably contoured as viewed in FIG. 9, while the remainder of the clasp body 94 may be formed as an integral curvilinear arm portion 102 which terminates in the axially extending flange 100. The generally curvilinear and cantilevered arm portion 102 may, if so desired as to possibly enhance its resiliency, be reduced in its vertical height (as viewed in FIGS. 4 and 7) as by the selective contouring thereof as generally depicted by contoured upper and lower edges 104 and 106.

OPERATION OF THE INVENTION

The manner in which linkage means 54 is operatively connected to lever or linkage means 28 has already been described. However, such description did not include the placement and/or assembly of the silencing means 74. The following is intended to describe such assembly of the silencing means 74 and its resulting function and effect on the linkage system or arrangement.

More particularly, referring primarily, for example, to FIGS. 1, 2, 4 and 6, prior to the insertion of the upper end 56 of linkage 54 through aperture 46 of lever 44, the silencer or resilient clip means 74 (as shown in, for example, FIGS. 4, 5 or 6) is rotated as about its axis 89 until the clearance slot 90 thereof is aligned with abutment or upset portion 58 of linkage 54 and at that time the upper portion 56 of linkage 54 is passed through aperture 88 of resilient clip means 74 with, of course, abutment means or upset portion 58 passing through the slot or opening 90. The resilient means 74 is then rotated relative to upper portion 56 of linkage 54 as to take the slot or opening 90 out of registry with abutment means or upset portion 60 thereby preventing the movement of the enlarged end 82 of the resilient means 74 beyond the start of abutment means 60. At this time the clasp or clip portion 94 may be pressed against as to become engaged with and resiliently locked to the depending portion of linkage means 54 and assume a position as generally depicted in FIG. 1. Thereafter, the abutment means or upset portion 58 of upper portion 56 of linkage 54 is passed through the clearance slot 48, as previously described, and the portion of the linkage 54 between abutments 58 and 60 received through cooperating aperture 46 of lever 44. Upon subsequent relative rotation of lever 44 and linkage 54, the abutment 58 is taken out of registry with clearance slot 48 and the two linkages are cooperatively locked in operating engagement with each other.

However, it should be noted that during the process of inserting the upper portion 56 surface 108 of resilient member 74 engages opposed surface 110 of lever or linkage member 28 and continued movement of upper portion 56 (to the left as viewed in FIG. 1) through the clearance passageway 46 of lever arm 44 causes the lever surface 110 to resiliently deflect arm or body portion 76 of the resilient member 74 toward arm or body portion 78 of member 74 thereby resiliently compressing the arms or body portions 76 and 78 generally toward each other with the resilient bight portion 80 primarily resisting such resilient deflection.

Consequently, when finally assembled as generally depicted in FIG. 1, the resilient or spring force thusly developed in resilient silencing means 74 causes the upper portion 56 of linkage 54 to be continually urged to the right, as viewed in FIG. 1, with the result that abutment or upset portion 58 is held against surface 112 of lever 28 and arm portion 44 thereof. Consequently, any vibrations into the linkage system will not result in any rattling as between linkage means 28 and 54 because: (a) the spring force of means 74 holds abutment means or upset portion 58 against surface 112 of lever arm 44 and (b) the spring force of means 74 holds abutment means or upset portion 60 spaced away from surface 110 of lever arm 44 as well as away from body or upper portion 82 of the silencer member 74.

In addition to the silencing function performed with respect to linkages 54 and 28, the silencer member or means 74 also serves to silence or eliminate rattles as between linkage means 50 and 54. As previously mentioned, for purposes of clarity the lower portion 62 of linkage 54 has been illustrated as centered within the clearance aperture or passage 52 of throttle lever arm 50. However, in reality, employing the teachings of the invention, results in lower portion 62 of linkage member being held against the arcuate portion 72 of the clearance passageway 52.

With particular reference to FIGS. 1 and 2, it can be seen that there is significant clearance as between the outer diameter of upper portion 56, of linkage 54, and the inner diameter of clearance aperture or passage 46. Such clearance, in turn, permits some degree of angular cocking of upper portion 56, and linkage member 54, relative to linkage or lever means 28. Because of the spring force of silencer means 74 tending to push linkage 54 away from lever means 28 and because the clip or clasp portion 94 is engaged with linkage member 54 at an elevation below the axis of the clearance passage 46 of lever 28 (as depicted in FIG. 1) the result is that linkage member 54 is urged in a generally counter-clockwise direction with the center of rotation thereof, for purposes of illustration, being as at the axial midpoint of clearance passageway 46 of lever 44. Even though the degree of such counter-clockwise rotation may be relatively small, it is nevertheless sufficient to swing lower end portion 62 of linkage means 54 in tangential abutting contact with the arcuate portion 72 of clearance aperture 52 and such abutting contact is also maintained by the spring force of silencer means 74 thereby precluding the occurrence of rattling noises as between linkage means 54 and 50.

As should now be apparent by practicing the invention it is possible to eliminate rattles, for example, as among three cooperating linkage means while providing anti-rattle or silencing means operatively connected to only two of such linkage means.

Although only a preferred embodiment of the invention has been disclosed and described, it is apparent that other embodiments and modifications of the invention are possible within the scope of the appended claims.

What is claimed is:

1. An anti-rattle apparatus for use in combination with first and second operatively interconnected linkage means in order to at least minimize the occurrence of rattling noises between said first and second linkage means, and wherein at least one of said linkage means carries abutment means, said anti-rattle apparatus comprising a first body portion having first and second ends, a second body portion having first and second ends, a resilient bight portion integrally joined to said first end of said first body portion and to said first end of said second body portion, and a connector portion carried by said second body portion as to be spaced from said bight portion, said connector portion being effective for operative connection to said second linkage means, said second end of said second body portion being effective to be placed in operative engagement with said second linkage means as to thereby resiliently urge said first and second linkage means in respectively opposite directions until said abutment means of said at least one of said linkage means operatively abuts against the other of said linkage means.

2. An anti-rattle apparatus according to claim 1 wherein when said first and second linkage means are resiliently urged in respectively opposite directions such that said first and second linkage means are urged in directions generally away from each other.

3. An anti-rattle apparatus according to claim 1 wherein said connector portion is of a generally C-shaped configuration and resiliently deflectable as to be able to resiliently open and accept therein said first linkage means.

4. An anti-rattle apparatus according to claim 1 wherein said first body portion at least near said second end thereof comprises a clearance passageway formed therethrough, said clearance passageway being effective to accept therethrough a portion of said first linkage means when said second end of said first body portion is placed in operative engagement with said second linkage means.

5. An anti-rattle apparatus according to claim 1 wherein said first body portion when placed in operative engagement with said second linkage means is situated generally between said first and second linkage means.

6. An anti-rattle apparatus according to claim 1 wherein said first body portion at least near said second end thereof comprises a clearance passageway formed therethrough and a relatively smaller clearance slot opening into said clearance passageway, said clearance passageway being effective to accept therethrough a portion of said first linkage means and said clearance slot being effective to accept therethrough said abutment means when said second end of said first body portion is placed in operative engagement with said second linkage means.

7. An anti-rattle apparatus according to claim 1 wherein when said first and second linkage means are resiliently urged in respectively opposite directions such that said first and second linkage means are urged in directions away from each other, wherein said connector portion is of a generally C-shaped configuration and resiliently deflectable as to be able to resiliently open and accept therein said first linkage means, wherein said first body portion when placed in operative engagement with said second linkage means is situated generally between said first and second linkage means, and wherein said first body portion at least near said second end thereof comprises a clearance passageway formed therethrough and a relatively smaller clearance slot formed therethrough and opening into said clearance passageway, said clearance passageway being effective to accept therethrough a portion of said first linkage means and said clearance slot being effective to accept therethrough said abutment means when said second end of said first body portion is placed in operative engagement with said second linkage means.

* * * * *